(No Model.)

A. E. BAGLEY.
BUNDLE CARRIER FOR HARVESTERS.

No. 506,653. Patented Oct. 17, 1893.

Attest
L. A. St. John
J. J. Kubicek

Inventor:
Alonzo E. Bagley
By J. M. St. John
Atty.

UNITED STATES PATENT OFFICE.

ALONZO E. BAGLEY, OF MECHANICSVILLE, IOWA, ASSIGNOR OF ONE-HALF TO LLOYD F. LOOS AND GEO. GORTNER, OF SAME PLACE.

BUNDLE-CARRIER FOR HARVESTERS.

SPECIFICATION forming part of Letters Patent No. 506,653, dated October 17, 1893.

Application filed May 19, 1893. Serial No. 474,736. (No model.)

*To all whom it may concern:*

Be it known that I, ALONZO E. BAGLEY, a citizen of the United States, residing at Mechanicsville, in the county of Cedar and State of Iowa, have invented certain new and useful Improvements in Bundle-Carriers for Harvesters; and I do hereby declare the following to be a full, clear, and exact description of the invention, such as will enable others skilled in the art to which it appertains to make and use the same.

The object of this invention is to provide a harvester with a bundle-carrier of novel construction capable of being operated to catch and discharge the bundles, in all positions of the harvester, and possessing other advantageous features as will hereinafter more fully appear.

The construction and peculiar characteristics of the invention are set forth in the following description, and in the accompanying drawings, in which—

Figure 1:
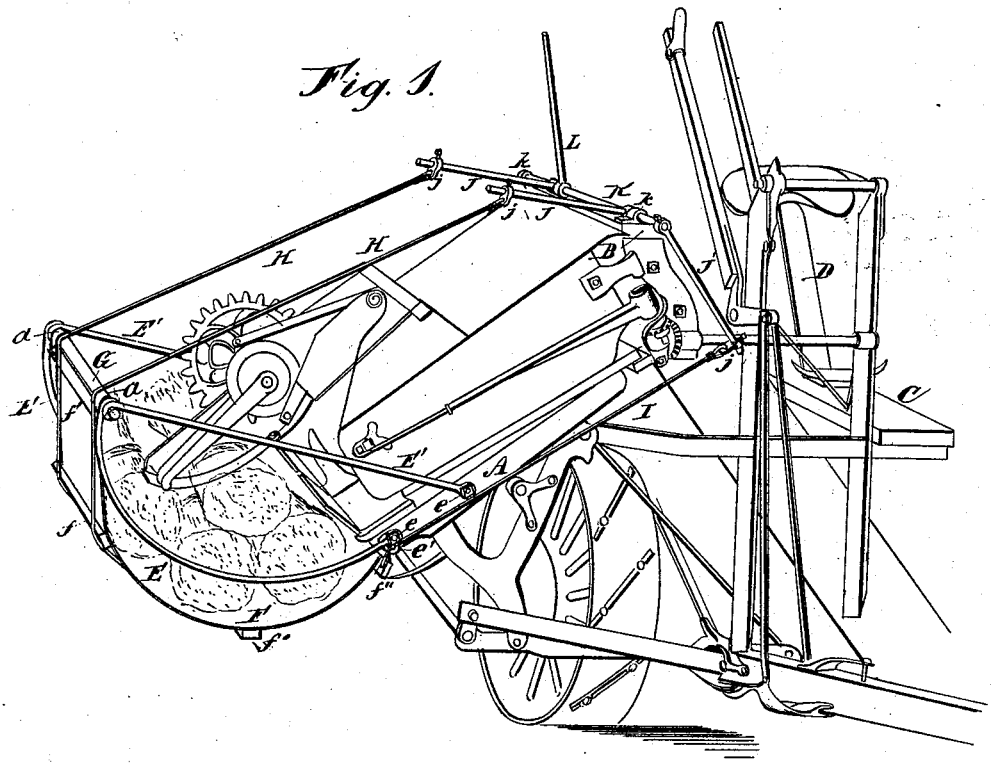
Figure 2:
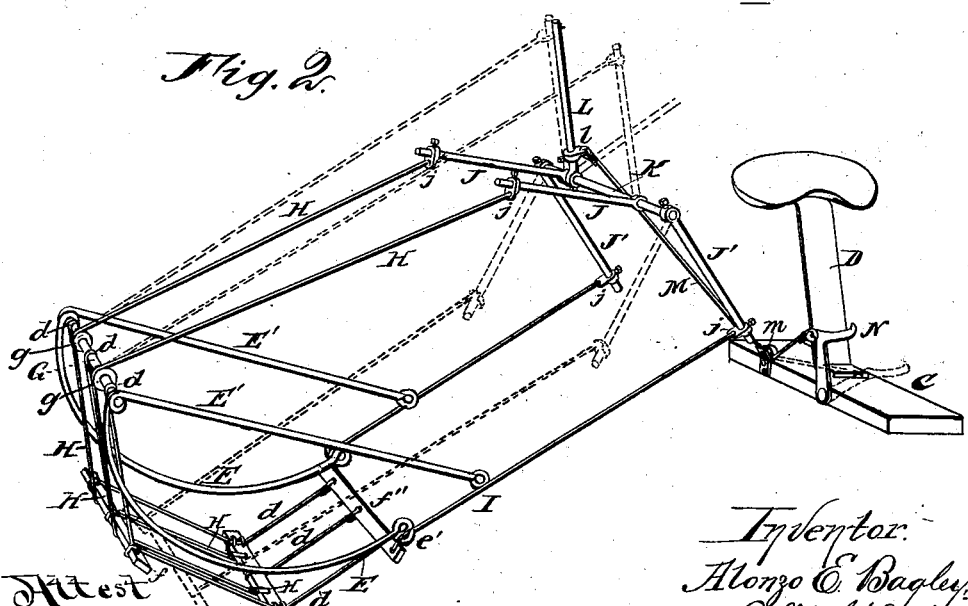

Figure 1 is a front view in perspective of a device embodying my invention, as applied to an ordinary type of harvester. Fig. 2 is a similar view of the same detached, but with some modifications in the detail of construction, as will be hereinafter pointed out.

A common difficulty met with in the use of bundle-carriers, particularly those using a series of outwardly projecting fingers swinging obliquely downward to discharge the load, arises from the fact that when the machine is tilted far forward, as in cutting short grain, or in going down a hill, the carrier discharges its load imperfectly, or not at all. There is also a tendency of the bundles to slip off over the outer ends of the fingers when working on a side-hill. It is the design of this invention to obviate these difficulties by so constructing the carrier that it is impossible for a bundle to escape from it until liberated by the operator, and to make this operation positive under all circumstances.

Referring now to the drawings, A designates the binder sill of a harvester of well-known type.

B is the longitudinal bar at the head of the "A frame."

C is the foot-board, and D the seat.

To some suitable part of the harvester frame, as for example, the binder sill, is attached a pair of brackets E E' by bolts e e. These brackets may be of any desired form or material. They are herein shown as formed of wrought-iron rods, with eyes at the ends for the fastening bolts, and an eye at the outer extremity to receive the longitudinal bar G. The upper member of the bracket may be straight, as shown, but the lower one is preferably curved downwardly somewhat, so as to serve the better for a guard at the end of the carrier, and prevent the bundles from sliding out when going up or down a steep incline. The lower portion of the brackets also acts as a guide for the carrier apron, as will appear hereinafter. From the bar G is suspended the outer end of the carrier apron or sling F, as by stirrups or hooks $a\ a$ connecting with a slat $f'$ to which this end of the apron is fastened. The apron also has other slats $f\ f'\ f''$ attached to it, to the last of which is connected, at each end, a trip-cord I. This cord is supported, and with it the connected slat, in the normal position, by a hook $e'$, which may be a projecting portion of the bracket itself. The other ends of the trip-cords connect with arms J' J' extending downward from a rock-shaft K mounted in bearings $k\ k$ on the bar B. The rock-shaft is also provided with other arms J J extending in an opposite direction, and to these are connected other trip-cords H H, which pass over the bar or shaft G and thence down under the carrier, connecting finally with one of the slats $f$, as shown in Fig. 2. The rock-shaft is actuated by a trip-lever L, within reach of the driver.

For the purposes of adjustment the arms J J J' J' are provided with suitable clips $j\ j\ j\ j$, fastened by set-screws, to which the trip-cords are connected.

The sling, instead of being an apron, as in Fig. 1, may be composed entirely of slats and cords, as shown in Fig. 2, the cords $d\ d\ d$ connecting directly with the bar G.

To diminish the friction of the cords passing over the bar G the same may be provided with small sheaves $g\ g$ turning freely on the bar.

In Fig. 2 is also illustrated a device for tripping the carrier with the foot. N is a foot-lever pivoted to the side of the foot-board C, and m is a small sheave-block connected therewith. A cord M connects at one end with the foot-lever, and at the other with a clip l attached to the lever L, the cord passing under the sheave. A forward movement of the foot-lever trips the carrier, as shown by the dotted lines.

The operation of the carrier in discharging its load is illustrated in Fig. 2. The trip-lever being thrown as indicated by the dotted lines, the under part of the carrier is drawn outwardly and from under the bundles. In effect they are literally rolled off the inner side of the carrier apron, and fall to the ground almost straight down from their suspended position, in a neat and compact heap. It is to be observed that in this operation the two sets of trip-cords act unitedly to strip the sling or apron from under the bundles, the cords I I allowing the inner edge to fall somewhat, and the other cords drawing upwardly and inwardly against the bundles at the same time that they are drawing the sling from under them. This produces the rolling action above referred to, and insures the uniform dropping of the bundles, whatever the position of the harvester.

It will be evident from the construction of the carrier, that a bundle once deposited in the carrier cannot escape therefrom until liberated by the operator.

The carrier is of simple construction, and may be made of quite inexpensive material and attached to any of the harvesters in general use. It is to be understood that after discharging its load the carrier returns to normal position by its own gravity.

Having thus described my invention, I claim—

1. In a bundle carrier, the combination with the harvester frame, substantially as described, of brackets attached to said frame, a supporting-bar at the outer extremity thereof, a flexible sheaf-holding sling suspended by one of its sides therefrom, a pair of trip-cords connected with the opposite side, and passing thence over suitable supports to a trip-lever, a pair of trip-cords also connected with the free edge of the sling and passing thence over said supporting-bar and connecting with suitable trip-levers, and means substantially as described for moving said respective trip-levers concurrently in opposite directions, as specified.

2. In a bundle-carrier, the combination with the harvester frame, substantially as described, of a pair of brackets attached to said frame and having a connecting bar or shaft at the outer extremity, a flexible, sheaf-carrying sling suspended by one of its sides therefrom, and provided with longitudinal slats, a pair of trip-cords connecting with the slat at the free side of the sling, supporting hooks for said cords, a pair of trip-cords connecting with the same slat and passing up over said bar, and a rock-shaft having a suitable shifting-lever, and provided with two pairs of arms, one pair extending upwardly and connecting with the trip-cords passing over the bar, and the other extending downwardly, and connecting with the cords passing over said hooks, substantially as and for the purpose set forth.

3. In a bundle-carrier, in combination with a harvester frame, substantially as described, a flexible sheaf-holding sling, one side of which is suspended from a support outside the path of the bundle-forming mechanism, and the other side by its tripping mechanism, from a portion of the harvester below the binder-table, and means substantially as described for moving the inner edge of the sling outwardly and upwardly to discharge the bundles.

In testimony whereof I affix my signature in presence of two witnesses.

ALONZO E. BAGLEY.

Witnesses:
ORVIL DAVISON,
C. C. MOFFIT.